US006491790B1

(12) United States Patent
Proverb et al.

(10) Patent No.: US 6,491,790 B1
(45) Date of Patent: *Dec. 10, 2002

(54) METHODS FOR REDUCING AMINE ODOR IN PAPER

(75) Inventors: Robert J. Proverb, Danbury, CT (US); Michael J. Scanlon, Mahwah, NJ (US)

(73) Assignee: Bayer Corporation, Pittsburgh, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/321,078

(22) Filed: May 27, 1999

Related U.S. Application Data

(60) Provisional application No. 60/099,781, filed on Sep. 10, 1998.

(51) Int. Cl.[7] .......................... D21F 11/00; D21H 25/02
(52) U.S. Cl. ................. 162/166; 162/158; 162/168.3; 162/164.1; 162/135
(58) Field of Search .................... 162/135, 158, 162/168.1–168.3, 169, 179, 164.6, 138, 136–137

(56) References Cited

U.S. PATENT DOCUMENTS

| 3,102,064 A | | 8/1963 | Wurzburg et al. | |
| 3,556,932 A | | 1/1971 | Coscia et al. | |
| 3,678,098 A | * | 7/1972 | Lewis et al. | 526/292.2 |
| 4,279,794 A | | 7/1981 | Dumas | |
| 4,606,773 A | | 8/1986 | Novak | |
| 4,657,946 A | | 4/1987 | Rende et al. | |
| 4,770,743 A | | 9/1988 | Weberndoerfer et al. | 162/158 |
| 4,785,055 A | * | 11/1988 | Dexter et al. | 525/356 |
| 4,882,087 A | | 11/1989 | Yoshioka et al. | 252/312 |
| 4,966,652 A | * | 10/1990 | Wasser | 162/135 |
| 5,176,748 A | * | 1/1993 | Nikoloff et al. | 106/211 |
| 5,374,335 A | | 12/1994 | Lindgren et al. | |
| 5,637,195 A | | 6/1997 | Foster | |
| 5,658,378 A | | 8/1997 | Tsai et al. | |
| 5,725,731 A | * | 3/1998 | Brungardt et al. | 162/72 |
| 5,759,249 A | | 6/1998 | Wasser | |
| 5,766,417 A | * | 6/1998 | Brungardt | 162/158 |
| 5,783,041 A | * | 7/1998 | Underwood | 162/164.1 |
| 5,837,100 A | * | 11/1998 | Gerli et al. | 162/168.2 |
| 5,853,542 A | * | 12/1998 | Bottorff | 162/168.2 |
| 5,891,304 A | * | 4/1999 | Shing | 162/168.2 |
| 6,059,930 A | * | 5/2000 | Wong Shing et al. | 162/168.2 |

FOREIGN PATENT DOCUMENTS

| JP | 56-143320 | 3/1983 |
| WO | WO 97/27364 | 7/1997 |

* cited by examiner

*Primary Examiner*—José Fortuna
(74) *Attorney, Agent, or Firm*—Joseph C. Gil; Richard E. L. Henderson; Godfried R. Akoril

(57) ABSTRACT

A method of reducing the level of malodorous amines emitted by paper when exposed to an alkaline environment is provided, which comprises making the paper so that it does not contain ammonium groups that are bonded to any polymer contained in the paper by only one chemical bond. Laminates which emit reduced levels of amines and which are comprised of this paper are also provided. In a preferred embodiment, the paper is sized with a sizing emulsion comprised of alkenyl succinic anhydride and a cationic water-soluble polymer having ammonium groups that are attached to the polymer by at least two chemical bonds.

10 Claims, No Drawings

METHODS FOR REDUCING AMINE ODOR IN PAPER

This application claims priority to U.S. Provisional Application Serial No. 60/099,781, filed Sep. 10, 1998, which is hereby incorporated herein by reference.

FIELD OF THE INVENTION

This invention relates to improvements in the making of cellulose-based products e.g. paper. More particularly, it relates to a way of reducing the level of malodorous amines emitted by paper. This is accomplished by making the paper so that it does not contain ammonium groups that are attached to a non-polymeric substance nor that are bonded to any polymer contained in the paper by only one chemical bond. Consequently, improved laminates comprised of this paper, optionally an adhesive, and a third material e.g. metal, wood or plastic, are also provided which emit reduced levels of amines. In a preferred embodiment, the paper is sized with a sizing emulsion comprised of a hydrophobic cellulose-sizing agent e.g. alkenyl succinic anhydride and a cationic water-soluble polymer having ammonium groups that are attached to the polymer by at least two chemical bonds.

BACKGROUND OF THE INVENTION

Paper is typically made with a wide range of additives, including starches, surfactants, synthetic polymers, pigments, fillers, and sizing agents. Many of these additives contain cationic groups, which are believed to render the additive substantive to anionic cellulosic fibers. Frequently these cationic groups are ammonium groups, i.e. quaternary or acid salts of amines. For instance, cationic polymeric emulsifying agents e.g. cationic starches, cationic synthetic polymers, etc. are widely used to help form and stabilize sizing emulsions, see e.g. U.S. Pat. Nos. 5,658,378; 4,657,946; and 4,606,773; which are hereby incorporated herein by reference. These sizing emulsions are widely used in papermaking to introduce sizing agents to the surface and interior of paper. These sizing emulsions typically contain a water-insoluble hydrophobic cellulose-sizing agent such as alkyl ketene dimer (AKD) or alkenyl succinic anhydride (ASA) that is dispersed or emulsified in aqueous solution. For example, ASA is a well-known sizing agent that has achieved considerable commercial acceptance in recent years. Since ASA is water-insoluble, it is frequently emulsified in water with a cationic polymeric emulsifying agent to form an ASA sizing emulsion which is then added to the paper stock or applied to the paper web during the papermaking process. Other potential sources of ammonium groups in papermaking are emulsifying agents such as those described in e.g. U.S. Pat. No. 5,759,249 and cationic agents such as those described in e.g. U.S. Pat. No. 3,102,064.

However, there is an odor problem with many paper and paper products made therefrom that contain ammonium groups. For example, when an ammonium group-containing ASA sizing emulsion is used to size paper and a liquid adhesive having an alkaline pH is subsequently used to bond the sized paper to aluminum foil to form a laminate, the laminate may emit an unpleasant amine-type odor. This odor may present an environmental problem for the maker of the laminate. Although in many cases the amine odor dissipates when the laminate is exposed to air, in some cases dissipation of the odor is difficult because all or part of the laminate is not stored in a ventilated condition. For instance, if the sized paper is laminated with aluminum foil and the resultant laminate is subsequently enclosed in packaging which is poorly ventilated e.g., food packaging (e.g., gum wrapper, liner for sticks of butter or margarine), as a liner for cigarette package, urn bag, fast food wrapper, etc, the user may perceive an odor when the package is opened. From a consumer packaging point of view, this is extremely undesirable.

Since an amine-type odor emanating from the paper was a problem and since ammonium groups are often the only source of the cationicity in many of the additives used in papermaking, it has been theorized that these ammonium groups were the source of the amine odor. As a result, some papermakers have been reluctant to use certain ammonium group-containing cationic additives in papermaking, particularly where the paper was being made for consumer packaging or other unventilated applications. In some cases, this reluctance has been to the detriment of the papermaker, especially where the cationic additive would provide a benefit if it were not for the odor problem. For instance, some papermakers do not use ASA sizing emulsions, in spite of their numerous and well-known advantages over other sizing agents, to make paper destined for laminates in consumer packaging applications because these sizing emulsions typically contain cationic polymeric emulsifying agents e.g. starch or synthetic polymers. Methods for reducing odor in paper have been disclosed which involve heating the surface of the paper web, see e.g. U.S. Pat. No. 5,637,195, but these methods may be energy intensive and inconvenient for the papermaker. Replacement of the ammonium groups with other cationic groups e.g. sulfonium or phosphonium groups tends to increase the expense of the additive and may present toxicity and/or environmental concerns. Therefore, there remains a problem in that many papermakers would prefer to use ammonium group-containing additives such as these typical ASA sizing emulsions, but have avoided doing so because of the belief that the ammonium groups would lead to amine odors that are unacceptable to the customer.

We have now discovered that the source of the odor problem is the presence in the paper of a particular type of ammonium group, not all ammonium groups as had been previously thought. In particular, we have discovered that the source of the problem is ammonium groups in which the nitrogen atoms are bonded to a non-polymeric substance or to polymer contained in the paper by only one chemical bond. The instant inventors have discovered that when the ammonium groups are bonded to a polymer contained in the paper by two or more chemical bonds, the odor problem is greatly reduced or eliminated.

SUMMARY OF THE INVENTION

The instant invention provides a solution to the amine odor problem discussed above by providing a method for reducing the level of alkyl amines emitted by paper, comprising (a) providing paper that contains ammonium groups and that is substantially free of (i) ammonium groups that are attached to a polymer contained in said paper by only one chemical bond, and (ii) ammonium groups that are attached to a non-polymeric substance, and (b) exposing said paper to a liquid having a pH of at least about 8. The emission of malodorous amine substances from the paper is greatly reduced or eliminated by the practice of the instant invention. The instant invention thus constitutes an effective and efficient solution to the odor problem.

In a preferred embodiment, the instant invention provides a solution to the amine odor problem discussed above by providing a method for sizing paper, comprising intermixing a sizing emulsion comprised of (i) alkenyl succinic anhydride, alkyl ketene dimer, or mixtures thereof, and (ii) a water-soluble polymer comprised of ammonium groups that are attached to said polymer by at least two chemical bonds, with a paper stock, or applying said sizing emulsion to a paper web, and forming paper from said paper web or said paper stock, wherein said sizing emulsion is used in an amount effective to size said paper, and wherein said paper, when contacted with a liquid having a pH of about 8 or greater, emits a lower level of alkyl amines than when said sizing emulsion is comprised of, instead of said (ii), the same amount of a water-soluble polymer comprised of ammonium groups that are attached to said polymer by only one chemical bond.

In another preferred embodiment, the instant invention provides a solution to the amine odor problem discussed above which allows the papermaker to use preferred sizing agents such as ASA, AKD, and mixtures thereof. Thus, the instant invention provides a laminate that does not emit alkyl amines, comprised of (i) paper, (ii) alkenyl succinic anhydride, alkyl ketene dimer, or mixtures thereof, and (iii) a film comprised of metal or plastic.

DETAILED DESCRIPTION

As used herein, "paper" is a general term that includes sheet-like masses and molded products made from fibrous cellulosic materials which may be derived from both natural and synthetic sources. The paper that is the subject of this invention generally contains ammonium groups. These ammonium groups may be introduced to the paper during the papermaking process or may be the result of a process that occurs after the paper is made. For instance, it is known in the art that paper may be sized through the use of a sizing emulsion comprised of (i) alkenyl succinic anhydride, alkyl ketene dimer, or mixtures thereof, and (ii) a cationic polymeric emulsifying agent e.g. cationic starch, cationic synthetic polymer, etc., in which ammonium groups are the source of the canonicity. The sizing emulsion may be added to the paper stock during the papermaking process, or applied to the formed paper.

An ammonium group, for the purposes of the instant invention, is a nitrogen atom that is chemically bonded to four other atoms, or to three other atoms if one of the chemical bonds is a double bond. As used herein, the term "chemical bond" refers to a covalent bond between atoms, and not to bonds that are generally recognized as ionic. Ammonium groups may be depicted as follows, where $R_1$, $R_2$ and $R_3$ are other atoms that are covalently bonded to nitrogen and X is a counterion that is ionically bonded to nitrogen:

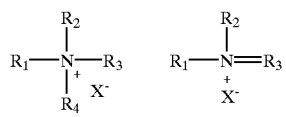

There are a variety of techniques known to those skilled in the art for determining whether paper contains ammonium groups. A preferred technique is Time-of-Flight Secondary Ion Mass Spectroscopy (ToF SIMS). This technique is generally well-known to those skilled in the art, see e.g. Russell J. Kulick and Jacob S. Brinen, "Probing Paper Surfaces with ToF SIMS: A New Problem Solving Tool," TAPPI Journal, Vol. 81: No. 2, February 1998, pp. 152–156. The ammonium groups present in the paper of the instant invention are generally the result of deliberate addition of additives to the papermaking process, and generally not the accidental or unintended consequence of any nitrogen-containing species originating in the wood from which the paper was made. Preferably, the ammonium groups in the paper are the result of ammonium group-containing cationic additives added during the papermaking process.

There are a broad variety of industrial and commercial processes and treatments in which paper may be exposed to a liquid. For instance, laminates may be formed by bonding sheets of paper to one another or to other materials e.g. plastic, wood, metal, etc., and a liquid is often used to provide an adequate bond between the materials. When bonding two sheets of paper together to form a laminate, it may be sufficient to simply wet one or both sheets with water, then to press them together and allow the resulting laminate to dry. However, in cases where a stronger bond is desired or dissimilar materials are being laminated, a liquid adhesive may be applied to one or both of the materials before bonding. In this context, "liquid" is a broad term that includes resins, aqueous solutions, pastes, emulsions, and any other flowable material capable of wetting the surface of the paper. The liquid may soak into the paper or other material, or may form one of the layers of the resulting laminate. The liquid may also dry, cure, or otherwise solidify to form a layer or coating on the paper. Paper may also be exposed to a liquid in other situations e.g. exposure to a liquid dye or ink, water, grease or oil, food residue, etc. In the instant invention, a preferred liquid is an adhesive, and a preferred adhesive is sodium silicate solution. The liquid is alkaline and typically has a pH of about 8 or greater, preferably about 9 or greater, even more preferably about 10 or greater.

The exposure of paper to alkaline liquids has presented a problem in that paper containing ammonium groups often emits alkyl amines as a result of the exposure. For the purposes of the instant invention, "alkyl amines" is a broad term which includes monoalkyl amines, dialkyl amines, and trialkyl amines, where the alkyl groups may be linear or branched and may have from one to about five carbon atoms. Examples of alkyl amines include methylamine, dimethylamine, trimethylamine, methylethylamine, dimethylethanolamine, triethylamine, dibutylmethylamine, etc. The emission of these alkyl amines from paper generally presents an odor problem, even at very low concentrations in air, because the human olfactory sense is extremely sensitive to their presence (typical detection threshold of about one part per billion in air).

As discussed above, papermakers have been reluctant to use any ammonium group-containing additives in paper that is likely to be exposed to a liquid having a pH of about 8 or greater, particularly when the paper is to be exposed to the liquid and then stored in an unventilated condition. The reluctance of the papermakers may be traced to the belief that all ammonium groups represented a potential source of alkyl amines. However, the instant inventors have now discovered that the source of the problem is not all ammonium groups as had been previously thought. Instead, the instant inventors have discovered that the emission of alkyl amines from paper may be greatly reduced or eliminated, and hence the odor problem reduced or eliminated, by producing paper that contains ammonium groups, but is substantially free of ammonium groups that are attached to a polymer contained in the paper by only one chemical bond and that is substantially free of ammonium groups that are attached to a non-polymeric substance. Thus, any polymer contained in the paper preferably contains an ammonium group that is attached to the polymer by two, three or four chemical bonds. In a preferred embodiment, paper is sized with a sizing emulsion comprised of (i) ASA, AKD, or mixtures thereof and (ii) a water-soluble polymer comprised of ammonium groups that are attached to said polymer by at least two chemical bonds.

Preferred polymers useful in the instant invention may contain the ammonium group in the backbone of the polymer or in a sidechain which is itself attached to the same or a different polymer chain, as depicted in the representative formulas below:

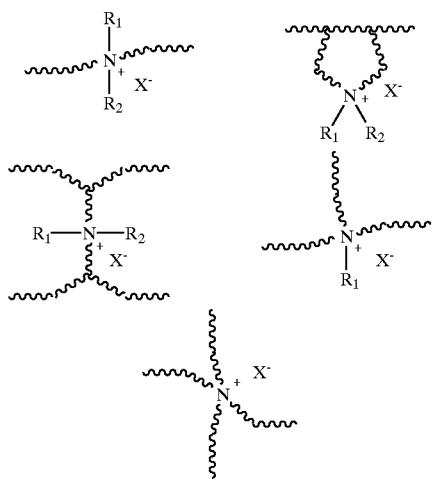

In these representative formulas, $R_1$ and $R_2$ may each individually be alkyl groups, preferably each individually may be methyl, ethyl, propyl or butyl, and X is a counterion, preferably chloride, bromide, iodide, methylsulfate, or ethylsulfate. The polymer may be added during processing, or may be present on the cellulosic fibers from which the paper is formed. Preferred cationic polymers include polyethylenimine and polyamine. Polyamines are a well-known class of polymers formed from amines e.g. formed from the reaction of ethylenediamine and/or diethylenetriamine with epichlorohydrin. A more preferred polymer contains recurring units of diallyidialkylammonium halide i.e. is prepared by polymerizing monomers such as diallyldimethylammonium chloride, diallyldiethylammonium chloride, etc., or by copolymerizing these monomers with nonionic comonomers such as (meth)acrylamide. A particularly preferred copolymer contains recurring units of diallyldimethylammonium chloride and acrylamide and is prepared in a manner known to those skilled in the art by copolymerizing the corresponding monomers. Preferably, copolymers contain about 50% or less of recurring diallyidialkylammonium halide units, preferably 25% or less, most preferably 10% or less, by mole based on total moles of recurring units. Most preferably, copolymers of diallyldialkylammonium halide and (meth)acrylamide are glyoxalated as described in U.S. Pat. No. 3,556,932, which is hereby incorporated herein by reference. For the purposes of the instant invention, recurring units in a polymer or copolymer may be referred to by the names of the respective monomers from which those recurring units are formed.

Polymers and copolymers of diallyidialkylammonium halide are substantially free of ammonium groups that are attached to the polymer or copolymer by only one chemical bond. This is because both of the polymerizable allyl groups in the diallyldialkylammonium halide monomer generally become incorporated into the polymer backbone during polymerization. Although there may be very infrequent occurrences in which only one of the allyl groups of a particular diallyidialkylammonium halide monomer becomes incorporated in the polymer backbone, the resulting polymers are still "substantially" free of ammonium groups that are attached to the polymer or copolymer by only one chemical bond because this happens so infrequently that it can be safely ignored for the purposes of the instant invention. This is because a polymer or copolymer having only a tiny amount of recurring units which contain ammonium groups that are attached to the polymer or copolymer by only one chemical bond, e.g. less than about 0.1 mole %, based on total moles of recurring units, does not generally present an odor problem when contained in paper.

The molecular weights of the polymers used in the instant invention are not critical and generally depend on the particular application. Molecular weights are weight average and may be measured by light scattering techniques known to those skilled in the art or by an appropriate technique such as High Pressure Size Exclusion Chromatography that has been calibrated with standards of known molecular weight. Generally, the polymers have a molecular weight of about 1,000 or greater, preferably about 10,000 or greater, more preferably about 100,000 or greater, even more preferably about 500,000 or greater, most preferably about 1,000,000 or greater.

The paper of the instant invention is substantially free of ammonium groups that are attached to a non-polymeric substance. In this context, "non-polymeric substance" means a material having a molecular weight of less than about 1,000, preferably less than about 500. Thus, the instant paper is preferably substantially free of such non-polymeric compounds as trialkyl amines having the general formula $R_1R_2R_3N$ and ammonium salts having the general formula $R_1R_2R_3R_4N_+X^-$, where $R_1$, $R_2$, $R_3$, and $R_4$ are each individually covalently bonded to the nitrogen atom and where R1, R2, $R_3$, and $R_4$ are each individually alkyl groups, aromatic groups or benzyl groups having from one to about 10 carbons, with the above-mentioned proviso that the total molecular weight be less than about 1,000, and X is a counterion such as chloride, bromide, iodide, methylsulfate, ethylsulfate, etc. that is ionically bonded to the nitrogen atom. More preferably, the instant paper is substantially free of ammonium salts such as those disclosed in U.S. Pat. No. 5,759,249, which is hereby incorporated herein by reference. Most preferably, the instant paper is substantially free of cationic organic salts e.g. cationic surfactants such as benzyltrimethylammonium chloride, benzyltriethylammonium chloride, lauryltrimethyl-ammonium chloride, soya trimethylammonium chloride, etc.

The paper of the instant invention generally contains ammonium groups, but is substantially free of ammonium groups that are attached to the polymer contained in the paper by only one chemical bond and is substantially free of ammonium groups that are attached to a non-polymeric substance. As discussed above, the presence of ammonium groups in the paper may be established by knowledge of the ingredients used to make the paper or by known analytical techniques such as by TOF SIMS. To determine whether the paper is substantially free of ammonium groups that are attached to a polymer contained in the paper by only one chemical bond and whether the paper is substantially free of ammonium groups that are attached to a non-polymeric substance, and to determine the level of alkyl amines emitted by paper, an analytical method comprised of a combination of chemical treatment and chromatography may be used. In general terms, the analytical method involves treating the paper with a strongly alkaline solution which has the effect of liberating alkyl amines from the paper, extracting the alkyl amines into the solution, and then identifying the alkyl amines in the solution by an appropriate technique. Preferably, the paper is treated with a strongly alkaline aqueous solution, in amounts that are effective to dissolve both the base used to make the alkaline solution and the alkyl amine that is extracted into the solution. A portion of the solution may then subjected to an appropriate analytical technique e.g. liquid chromatography, high pressure liquid chromatography, gas chromatography, capillary gas chromatography, gas-liquid chromatography, chromatography coupled with mass spectroscopy, etc. that is capable of detecting and identifying the liberated alkyl amine(s). Preferably, the solution is placed into a closed container for a period of time, and the gas above the solution is sampled for the presence of alkyl amine. Chromatographic techniques per se are well-known to those skilled in the art, see e.g. M. A. Kaiser and C. Dybowski, "Chromatography," in *Encylopedia of Separation Technology*, Vol. 1, Ed. D. M. Ruthven, John Wiley and Sons, New York 1997 pp. 299–320. Chromatographic techniques for separating, detecting and identifying alkyl amines have been known for many years, see e.g. S. D. Nogare and R. S.

Juvet, *Gas-Liquid Chromatography*, lnterscience, New York, 1962, pp. 48–51.

The capabilities e.g. sensitivity, accuracy, precision, etc. of any particular method may be calibrated by preparing a series of paper samples which contain known amounts of ammonium groups that are attached to a polymer contained in the paper by only one chemical bond and/or ammonium groups that are attached to a non-polymeric substance, then subjecting these paper samples to the selected method. Preferably, the paper samples used for calibration contain known amounts of triethylamine. The method may be quantified by developing a correlation between the observed response level of the method and the known level of incorporation in the paper. When done in such a properly calibrated and quantitative fashion, the method may be used to determine whether one particular piece of paper or paper laminate will emit a lower level of alkyl amines when exposed to a liquid having a pH of about 8 or greater than another particular piece of paper or paper laminate. This is because the level of alkyl amines detected by the method generally correlates with the level of amines emitted by a paper or paper laminate when exposed to a liquid having a pH of about 8 or greater.

For instance, the following general method may be preferably applied to determine whether paper is substantially free of (i) ammonium groups that are attached to a polymer contained in the paper by only one chemical bond and (ii) ammonium groups that are attached to a non-polymeric substance: A sample of the paper is stirred in a strongly alkaline solution having a pH of about 12 or greater, such as a solution of sodium hydroxide or potassium hydroxide, for several hours at a moderately elevated temperature to form a mixture of wet paper and aqueous base. The gas above the mixture is then sampled and analyzed using a commercially available gas chromatography instrument equipped with an appropriate detector, typically calibrated using standard samples of known alkyl amines. The strongly alkaline solution is preferably aqueous sodium hydroxide, the gas chromatography instrument is preferably a capillary gas chromatography instrument, and the gas chromatography instrument is preferably equipped with a nitrogen/phosphorous detector or is coupled to a mass spectrometer.

It this method, properly calibrated, fails to detect the presence of alkyl amines, then the paper is substantially free of ammonium groups that are attached to a polymer contained in the paper by only one chemical bond and the paper is substantially free of ammonium groups that are attached to non-polymeric substances. Consequently, the paper will not emit alkyl amines when exposed to a liquid having a pH of about 8 or greater. If this method, properly calibrated, detects alkyl amines, this generally means that the paper contains ammonium groups that are attached to a non-polymeric substance and/or contains ammonium groups that are attached to a polymer contained in the paper by only one chemical bond.

In a preferred embodiment, the instant invention provides a method for sizing paper. This method comprises intermixing a sizing emulsion comprised of (i) a hydrophobic cellulose-sizing agent, preferably ASA, AKD, or mixtures thereof, and (ii) a water-soluble polymer comprised of ammonium groups that are attached to said polymer by at least two chemical bonds, with a paper stock, or applying said sizing emulsion to a paper web, and forming paper from said paper web or said paper stock, wherein said sizing emulsion is used in an amount effective to size said paper, and wherein said paper, when contacted with a liquid having a pH of about 8 or greater, emits a lower level of alkyl amines than when said sizing emulsion is comprised of, instead of said (ii), a comparable water-soluble polymer comprised of ammonium groups that are attached to said polymer by only one chemical bond. Sizing emulsions useful in this method are generally prepared by intermixing the hydrophobic cellulose-sizing agent with the water-soluble polymer in water, preferably with a suitable high-speed mixing device such as a blender. The method of making sizing emulsions per se is generally well-known in the art, see e.g. U.S. Pat. No. 4,657,946 and U.S. Pat. No. 4,606,773, which are hereby incorporated herein by reference. Suitable water-soluble polymers include all of those mentioned above and thus may be any cationic polymer which contains an ammonium group that is attached to the polymer by two, three or four chemical bonds. Preferred water-soluble polymers are also the same as stated above. Preferably, the water-soluble polymer is substantially free of ammonium groups that are attached to the polymer by only one chemical bond. Preferably, the sizing emulsions are substantially free of ammonium groups that are attached to a non-polymeric substance. The ratio of hydrophobic cellulose-sizing agent to water-soluble polymer is generally in the range of about 1:20 to about 4:1, preferably about 1:10 to about 1:1, by weight based on total weight.

The sizing emulsions of the instant invention are generally used in an amount effective to size the paper, preferably at a dosage of about 0.1 to about 10 pounds of hydrophobic cellulose-sizing agent per dry ton of paper, more preferably about 1 to about 5, most preferably about 1.5 to about 2.5, same basis. The sizing emulsion may be intermixed with the paper stock during papermaking, or applied to the paper web or formed sheet. Other conventional papermaking additives e.g. pigments, fillers, sodium sulfate, calcium carbonate, calcium chloride, etc. may also be added to the paper stock or applied to the paper web. Preferably, alum (aluminum sulfate) is also added to the paper stock or applied to the paper web, most preferably added at substantially the same time as the sizing emulsion.

When contacted with a liquid as described above having a pH of about 8 or greater, the paper of the instant invention, including that formed using the instant sizing emulsions, generally emits a lower level of alkyl amines than when the paper contains a water-soluble polymer comprised of ammonium groups that are attached to the polymer by only one chemical bond. Thus, when the paper is made using a sizing emulsion as described above, i.e. a sizing emulsion comprised of a water-soluble polymer comprised of ammonium groups that are attached to the polymer by at least two chemical bonds, it generally emits a lower level of alkyl amines than when the sizing emulsion is comprised of, instead of that polymer, the same amount of a water-soluble polymer comprised of ammonium groups that are attached to the polymer by only one chemical bond.

In another preferred embodiment of the instant invention, laminates are formed from the paper described herein. As used herein, "laminate" is a general term which includes materials having more than one layer, where one or more of the layers is comprised of paper. Generally, laminates are formed by bonding together similar or dissimilar materials. For instance, layers of paper may be bonded together by wetting or exposing one or more of the layers with a liquid as described above, preferably an adhesive, optionally applying pressure, then allowing the liquid to dry or otherwise cure to form a bond between the layers. The paper and the liquid may be bonded to a third material, preferably plastic, wood or metal, most preferably plastic or metal. The metal or plastic is most preferably in the form of a foil or film having a thickness of less than about 1 millimeter, preferably less than about 0.5 millimeter, most preferably less than about 0.2 millimeter. The presence of the liquid in the final laminate is optional, as the liquid may completely evaporate, resulting in a laminate which does not contain the liquid. Preferably, the liquid remains in a cured, dried, or otherwise solidified form, either at the interface or absorbed into one or more of the layers of the laminate. The laminate may be comprised of multiple layers comprised of paper, various liquids (including dried and/or cured liquids) and various third materials, and the multiple layers may be bonded together in a single step or in multiple steps. The dried or cured liquid itself may be one of the layers of the laminate. When the dried or cured liquid is on the surface of the resulting laminate, the laminating process may be akin to a coating process and the dried or cured liquid may be considered a coating. Ways of making laminates are well-known to those skilled in the art, see e.g. James P. Casey, *Pulp and Paper*, $2^{nd}$ Edition, Volume III, Interscience Publishers Inc., New York, 1961, pp. 1860–1870.

Preferably, the instant laminates are formed from the paper of the instant invention and a dissimilar material, more preferably the paper and metal, most preferably the paper, a liquid (preferably in a dried or cured form), and a metal that comprises aluminum. In a particularly preferred embodiment, the paper is exposed to an adhesive having a pH of about 8 or greater, preferably sodium silicate solution, and the exposed paper is bonded to aluminum, preferably aluminum having a thickness of less than about 1 millimeter, even more preferably less than about 0.5 millimeter, most preferably less than about 0.2 millimeter, to form a paper/aluminum laminate. The resulting paper/aluminum laminate is particularly suitable for unventilated consumer packaging applications because the paper, by virtue of being substantially free of (i) ammonium groups that are attached to a polymer contained in the paper by only one chemical bond and (ii) ammonium groups that are attached to a non-polymeric substance, emits lower levels of odor e.g. alkyl amines than when the paper does contain ammonium groups that are attached to a polymer contained in the paper by only one chemical bond and/or ammonium groups that are attached to a non-polymeric substance. In an even more particularly preferred embodiment, the paper in the resulting paper/aluminum laminate was sized using a sizing emulsion comprised of (i) alkenyl succinic anhydride, alkyl ketene dimer, or mixtures thereof, and (ii) a water-soluble polymer comprised of ammonium groups that are attached to said polymer by at least two chemical bonds. In this case, the paper (and therefore the resulting laminate) emits a lower level of alkyl amines, preferably no alkyl amines, than when the sizing emulsion is comprised of, instead of said (ii), the same amount of a water-soluble polymer comprised of ammonium groups that are attached to said polymer by only one chemical bond.

Preferred laminates emit a reduced level of amines or, more preferably, do not emit alkyl amines, as determined by the analytical method described above. They are thus comprised of (i) paper, preferably paper that has been sized with a sizing emulsion which comprises a water-soluble polymer comprised of ammonium groups that are attached to said polymer by at least two chemical bonds, (ii) a hydrophobic cellulose-sizing agent, preferably ASA, AKD or mixtures thereof, and (iii) a third material, preferably a plastic or metal, more preferably a metal comprised of aluminum. Most preferably, these laminates also contain sodium silicate, generally as a result of using an aqueous solution of sodium silicate, having a pH of about 8 or greater, to bond the third material to the paper. The use of sodium silicate as an adhesive is well-known in the art, see e.g. James P. Casey, *Pulp and Paper*, $2^{nd}$ Edition, Volume III, Interscience Publishers Inc., New York, 1961, pp. 1897–1899. Heretofore, laminates comprised of sizing agents such as ASA, AKD or mixtures thereof were not favored because of the belief that the cationic polymeric emulsifying agents used to emulsify these sizing agents would cause the resulting laminate to emit an amine odor e.g. alkyl amine. However, now that the instant inventors have discovered that the amine odor does not result from the presence of all ammonium groups but only those which are bonded to a polymer contained in the paper by only one chemical bond or those that are attached to a non-polymeric substance, laminates which do not emit malodorous alkyl amines are provided by the practice of the instant invention.

A qualitative technique for determining whether a paper or a laminate emits a reduced level of alkyl amines, and hence whether the paper or laminate is substantially free of ammonium groups that are attached to a polymer contained in said paper by only one chemical bond or ammonium groups that are attached to a non-polymeric substance, is by way of an odor test. This is because the human olfactory sense is very sensitive to alkyl amines. Thus, a paper may be exposed to a liquid having a pH of about 8 or greater, then placed into an unventilated enclosure such as a sealed glass vial or plastic bag for a period of time, e.g. several days. A human or group of humans having unimpaired olfactory abilities may then open the enclosure and conduct a "sniff" test to determine whether the paper emits an alkyl amine odor. A laminate may be tested in a similar manner, except that it may not be necessary to expose the laminate to a liquid having a pH of about 8 or greater where the laminate has been made by exposing the paper to an adhesive having a pH of about 8 or greater. If the human or group of humans having unimpaired olfactory abilities is unable to smell an alkyl amine odor, then the paper or laminate is substantially free of alkyl amine odor and the paper or laminate is substantially free of ammonium groups that are attached to a polymer contained in said paper by only one chemical bond and substantially free of ammonium groups that are attached to a non-polymeric substance. Since it is important that the paper or laminate emit a reduced level of alkyl amine odor or no odor at all, the analytical method discussed above is preferably at least as sensitive as this odor test to the presence of ammonium groups that are attached to a polymer contained in the paper by only one chemical bond and/or ammonium groups that are attached to a non-polymeric substance. Thus, by the practice of the instant invention, a preferred method of reducing the level of alkyl amines emitted by paper or a laminate results in a paper or laminate that is substantially free of alkyl amine odor.

The following examples are provided to illustrate the invention and do not limit the scope of the invention in any way.

EXAMPLES

The paper stock used in the following examples was prepared as follows: A commercially available 50/50 hardwood/softwood bleached kraft was refined to a Canadian Standard Freeness of 450–500 milliliters (mL), then blended with water, precipitated calcium carbonate filler (7%), sodium sulfate (80 ppm), and calcium chloride (50 ppm) to a provide pulp having a solids level of 0.5%. The pH was adjusted to 7.8.

Example 1C

Control samples of paper were made from the paper stock using a commercially available laboratory handsheet mold. The target basis weight was 70 grams per square meter. After the sheet was formed, it was pressed at 15 psig and drum dried at 240° F. for 30 seconds.

Example 2C

Comparative samples of paper were made by the same procedure as Example 1C, except that a commercially available anionic polyacrylamide retention aid was mixed with the paper stock before the paper was formed. The dosage of retention aid was one pound per dry ton of pulp fiber.

Example 3C

A commercially available cationic yellow dent corn starch was used to make samples of paper. This polymeric starch had a nitrogen content of 0.36% and contained pendant quaternary ammonium groups (ammonium groups that are attached to the starch by only one chemical bond). The starch was cooked at 5% starch solids and then diluted to 0.5% solids. This diluted starch was added to paper stock at a dosage of 20 pounds of real polymer per ton of dry fiber in paper stock and mixed for one minute. An anionic polyacrylamide retention aid was added next at a dosage of one pound per ton of dry fiber in paper stock. The contents were mixed for 15 seconds, and the resulting mixture was formed into paper by the same procedure as Example 1C.

Example 4

A commercially available glyoxalated acrylamide/diallyidimethylammonium chloride (90/10) copolymer was used to make samples of paper. This polymer was substantially free of ammonium groups that are attached to the polymer by only one chemical bond. This polymer was added to paper stock at a dosage of 20 pounds of real polymer per ton of dry fiber in paper stock and mixed for one minute. An anionic polyacrylamide retention aid was added next at a dosage of one pound per ton of dry fiber in paper stock. The contents were mixed for 15 seconds, and the resulting mixture was formed into paper by the same procedure as Example 1C. This paper contained ammonium groups and was substantially free of (i) ammonium groups that are attached to a polymer contained in this paper by only one chemical bond, and (ii) ammonium groups that are attached to a non-polymeric substance.

Examples 5C –8

Aqueous base solutions were prepared in each of four separate 40 mL vials by adding 20 mL of water and one mL of 25% NaOH to each vial. The pH of each of these solutions was about 13. The papers of Examples 1–4 were exposed to these base solutions by placing one gram of each paper into the vials. The vials were not completely filled, so that there was a space above the surface of the liquid. The vials were loosely capped and heated overnight at 65° C. The space above the liquid was exposed to a polydimethylsiloxane/divinylbenzene microfiber for about 30 minutes, then the microfiber was desorbed in the injection port of a gas chromatography (GC) instrument for 20 seconds at 150° C. This GC was equipped with a nitrogen/phosphorous detector to measure the amounts of alkyl amine emitted by each paper. The GC had been previously calibrated with triethylamine standards by putting known amounts of triethylamine onto sheets of control paper and subjecting them to the same treatment and analysis.

The levels of alkyl amine emitted by the papers of Examples 1–4 as a result of exposure to the aqueous base are shown below in Table 1. Two runs were performed on each sample of paper. The data in Table 1 shows that the paper made using starch (paper of Example 3C) emitted significant levels of alkyl amine when exposed to aqueous base. In contrast, the paper made using a glyoxalated copolymer of diallyldialkylammonium halide and acrylamide (paper of Example 4) emitted no more alkyl amine than a control paper (paper of Example 1C) or a paper made using only anionic polyacrylamide retention aid (paper of Example 2C).

TABLE 1

| No. | Description | Alkyl amine level (parts per million) |
|---|---|---|
| 5C | Paper of Example 1C | 0.08, 0.04 |
| 6C | Paper of Example 2C | 0.04, 0.04 |
| 7C | Paper of Example 3C | 0.40, 0.44 |
| 8 | Paper of Example 4 | 0.02, 0.02 |

Example 9

A series of four papers is prepared as described in Examples 1–4 above. Each of the papers is exposed to aqueous base and then placed into a separate sealed vial. A group of humans having unimpaired olfactory capabilities is asked to open each vial and briefly smell the contents, then record their observations. A control vial containing triethylamine is provided to the humans for comparison. A paper prepared as in Example 4 is found to be substantially free of alkyl amine odor.

We claim:

1. A method comprising reducing the level of alkyl amines emitted by sized paper by (a) providing a paper that has been sized with a sizing emulsion comprising (1) a hydrophobic sizing agent, and
(2) a water-soluble polymer that (A) contains ammonium groups in which substantially all of the ammonium groups are attached by at least two chemical bonds to the polymer and (B) has a weight average molecular weight of at least about 1,000,000, wherein
   (i) substantially all of the ammonium groups of the sized paper are attached by at least two chemical bonds to the polymer having a weight average molecular weight of at least about 1,000,000, and
   (ii) the sizing emulsion and the sized paper are substantially free of ammonium groups attached to non-polymeric substances, and
(b) exposing said paper to a liquid at a pH of at least about 8.

2. A method as claimed in claim 1, wherein the water-soluble polymer containing ammonium groups is a copolymer of acrylamide and diallyldimethylammonium chloride.

3. A method as claimed in claim 1, wherein the hydrophobic sizing agent is alkenyl succinic anhydride.

4. A method as claimed in claim 1, wherein the water-soluble polymer containing ammonium group is a glyoxalated copolymer of acrylamide and diallyidimethylammonium chloride.

5. A method as claimed in claim 1, wherein said paper, after exposure to said liquid, is substantially free of alkyl amine odor.

6. A method as claimed in claim 1, wherein said liquid is an adhesive.

7. A method as claimed in claim 6, wherein said adhesive is a solution of sodium silicate.

8. A method as claimed in claim 6, which further comprises bonding a third material to said paper and said adhesive to form a laminate.

9. A method as claimed in claim 8, wherein said third material is a metal.

10. A method as claimed in claim 9, wherein said metal is comprised of aluminum and has a thickness of about 1 millimeter or less.

* * * * *